United States Patent [19]

Lemrow et al.

[11] 4,333,447
[45] Jun. 8, 1982

[54] SOLAR RECEIVER TUBE SUPPORT

[75] Inventors: Craig M. Lemrow, Big Flats; Arthur H. Wilder, Corning, both of N.Y.

[73] Assignee: Corning Glass Works, Corning, N.Y.

[21] Appl. No.: 156,761

[22] Filed: Jun. 4, 1980

[51] Int. Cl.³ ............................................... F24J 3/02
[52] U.S. Cl. .................................... 126/443; 126/438
[58] Field of Search ..................... 126/443, 438, 439

[56] References Cited

U.S. PATENT DOCUMENTS 2,872,915  2/1959  Bowen ........................... 126/439
4,205,655  6/1980  Hunt ............................. 126/443

Primary Examiner—Carroll B. Dority, Jr.
Attorney, Agent, or Firm—John P. De Luca

[57] ABSTRACT

The invention relates to a support for a solar receiver element which is adapted to carry the element and accommodate cyclical thermal expansion and contraction by use of roller bearings.

14 Claims, 7 Drawing Figures

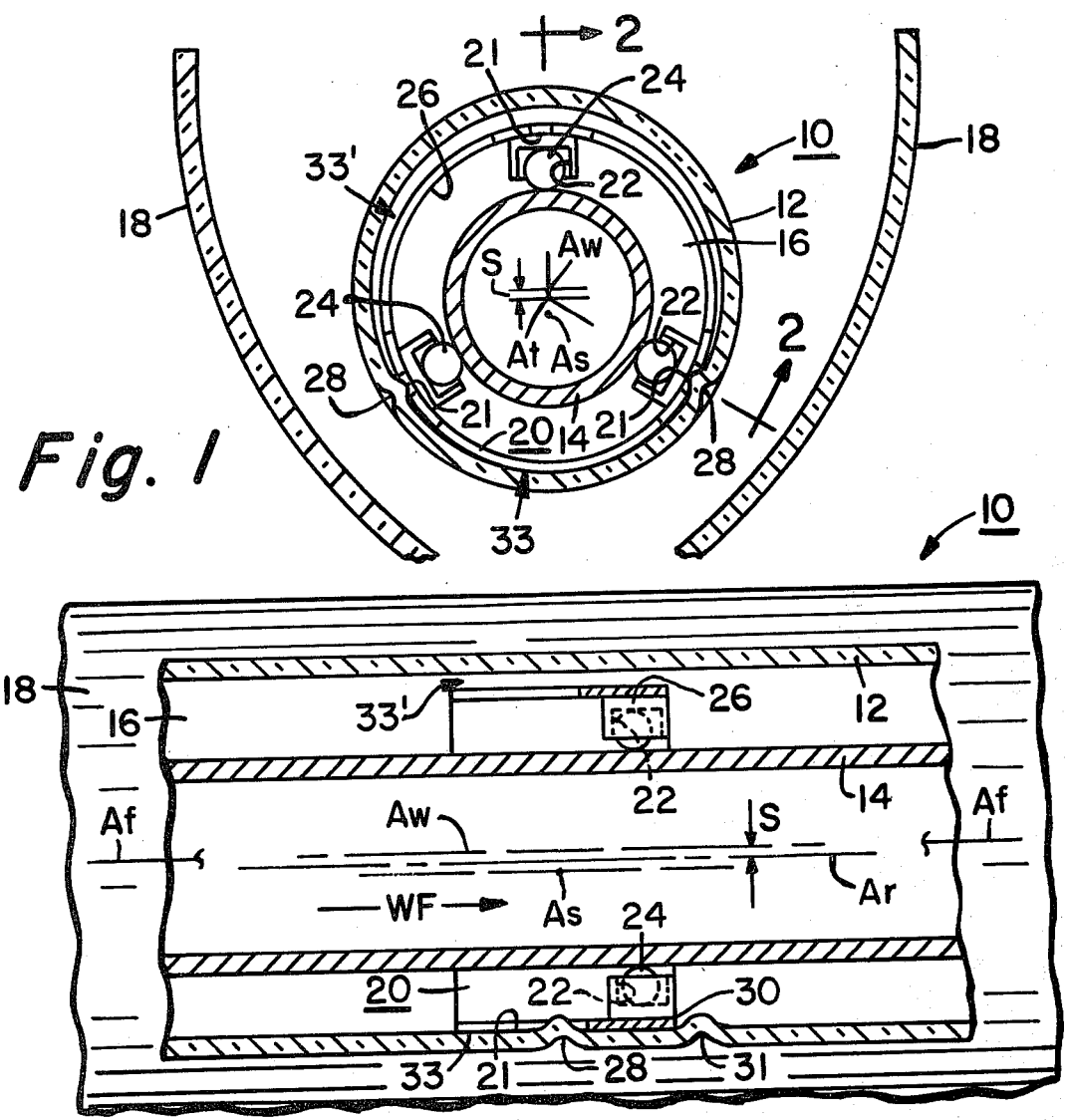
Fig. 1
Fig. 2
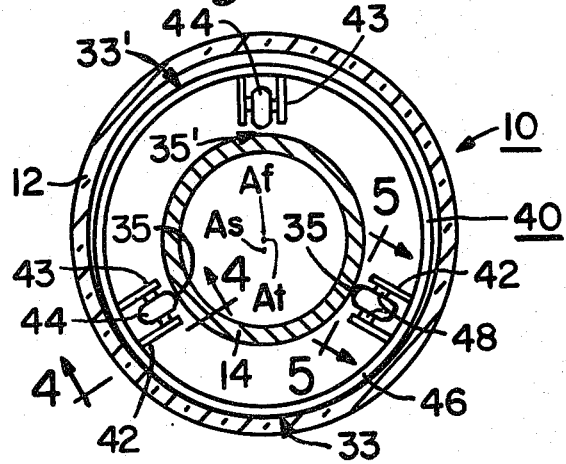
Fig. 3

SOLAR RECEIVER TUBE SUPPORT

BACKGROUND OF THE INVENTION

In designing evacuated solar receivers for parabolic trough concentrators, it is desirable to make the receiver or absorber and the evacuated envelope surrounding same as long as possible such that connection and end losses are minimized. By reducing the number of ends, materials requirements are reduced and fabrication is simplified. Further, manifolding is simplified and the significant thermal losses associated therewith can be substantially reduced.

It now appears feasible to manufacture receivers in excess of 20 feet in length. A metal receiver or absorber tube this length would, by its own weight and that of the heat transfer fluid contained therein, deflect much more than would be tolerable to maintain the absorber within the focal line of a parabolic trough. For example, a receiver tube 24 feet long consisting of a steel tube 1⅜" O.D. by 0.1" wall thickness supported at its ends would deflect by its own weight about 4" near its center. A glass tube or envelope 2½" O.D. by 0.1" wall thickness would deflect about 1½". Even if such bending could be tolerated from a stress point of view, the fact is the absorber or receiver portion of the solar collector would be in contact with the glass envelope and would thus create intolerable thermal losses which the evacuated envelope is designed to reduce. The prior art shows various receiver tube supports. See for example FIGS. 8 and 22 in U.S. Pat. No. 4,133,298. The disadvantages of such a system will become readily apparent hereinafter from the present disclosure.

In addition to the deflection problem mentioned above, the operating temperatures contemplated e.g. 650° F., means that a steel receiver tube or absorber would expand linearily about 1½" through an extreme excursion from cold to hot in the thermal cycle. The support for the absorber therefor must be able to accommodate the movement between the absorber and the glass envelope. The glass also expands but to a much lesser degree since the thermal expansion is much lower and the temperature for the glass would not reach the temperature of the absorber (probably no more than 250° F.).

The support for an extremely long receiver tube therefore must be substantial to provide the support necessary considering the greater weight and amount of deflection and must also be capable of accommodating the linear expansion of the receiver tube while at the same time protecting the inside surface of the glass envelope or housing from abrasion over a contemplated useful life of twenty years.

SUMMARY OF THE INVENTION

In a housing for a solar energy collector having a solar window portion and a thermally cyclical solar energy receiver element located therewithin, a support element has been provided adapted to locate the receiver in spaced relation with respect to the window and to accommodate linear expansion and contraction of the receiver element relative to the window due to thermal cycling thereof. The support includes a bearing adapted to engage opposed surfaces of the receiver element and the window and includes a plurality of roller bearings being selectively located between the opposed surfaces for spacing and supporting one against the other and being free to rollably carry the receiver element as it expands and contracts during thermal cycles. A frame member is located between the surfaces and includes a retainer for associately accommodating one each of the roller bearings therein and securing each to a limited path of rotation relative to the window and receiver element during each thermal cycle.

DESCRIPTION OF THE DRAWINGS

FIG. 1 is an end section in elevation of a receiver tube incorporating the support member of the present invention.

FIG. 2 is a fragmented side section in elevation taken along line 2—2 of FIG. 1.

FIG. 3 is an end section of another embodiment of the present invention incorporating pinned rollers therein.

DESCRIPTION OF THE PREFERRED EMBODIMENT

Figure 4:
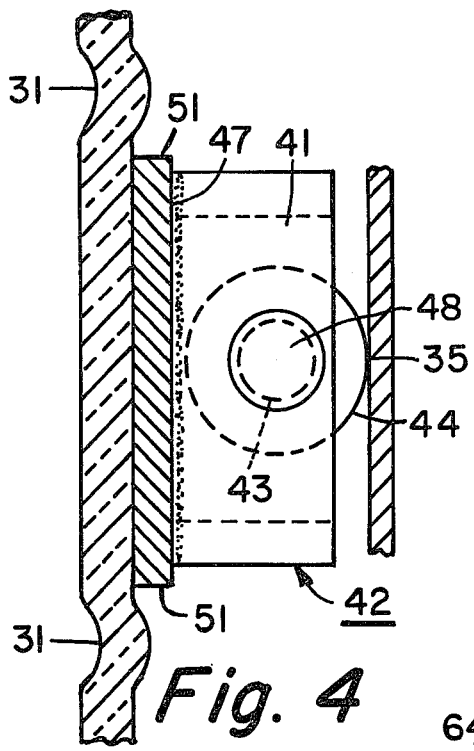
FIGS. 4 and 5 are enlarged side and top elevations of the pinned rollers illustrated in FIG. 3, respectively taken along lines 4—4 and 5—5 of FIG. 3.

FIGS. 1 and 2 show an embodiment of the present invention in the environment of an evacuated tubular solar collector or receiver 10. The collector 10 includes a tubular glass envelope or solar window 12 surrounding a metal absorber or receiver tube 14 located axially therealong. The window 12 and receiver 14 each have respective central axes Aw and Ar. While in the collector 10 shown, the axes Aw and Ar may be designed coaxially, one appears spaced from the other for reasons hereinafter explained. The receiver tube 14 is separated from the envelope or window 12 by an evacuated space 16. A working fluid WF may be passed through the absorber tube 14 to conduct sensible heat therefrom as a result of insolation of the absorber 14.

In certain kinds of solar collectors, the insolation may be concentrated by the use of a reflector 18 in the form of a parabolic mirror having a linear focal line Af. While the geometry of such reflectors is important to the art of concentrating solar collectors, for the purpose of the explanation herein, it will be assumed that the axis Af of the reflector 18 is located more or less colinearily with the window axis Aw and closely with the receiver tube axis Ar. Thus, it should be understood that, if the absorber 14 moves substantially away from the focal line Af the concentrating power of the reflector 18 will be reduced and hence the efficiency of the collector 10 will be diminished.

A support 20 is located in the evacuated space 16 between the envelope 12 and the absorber 14. The support 20 is adapted to space the absorber or receiver tube 14 from the envelope 12 and maintain the absorber axis Ar closely along the focal line Af as much as possible. In the embodiment shown the support 20 includes a frame member 26, a plurality of retainer cavities 22 and associated ball bearings 24 located therein. The frame 26 may be an annular ring which loosely fits about the absorber 14 and within the inside dimension of the envelope 12. Frame 26 has a plurality of linear slots 21 for accommodating one or more appropriately located wall dimples 28 in window 12. Each slot 21 and dimple 28 cooperate to prevent axial movement of the frame 26 (to the left in FIG. 2) and circumferential motion (rotationally in FIG. 1). One or more additional wall dimples 31 engage a margin 30 of frame 26 to prevent axial motion away from dimple 28 (to the right in FIG. 2). As the absorber 14 expands and contracts under the influence of the solar radiation or insolation the lower two of ball bearings 24 provide support for and accommodate the linear expansion and contraction of the absorber 14. The frequent thermal cycling of the absorber 14 creates in the support 20 a tendency to creep axially and circumferentially of the tube 12. Since the frame 26 is retained in position as shown by dimples 28 and 31, and the ball bearings 24 roll against the metal absorber tube 14, the envelope 12 is protected from glass to metal abrasion of its inside surface through uncounted thermal cycles over its useful life.

The frame 26 is purposely designed to be smaller in diameter than that of the window 12 to facilitate assembly and to minimize contact area therebetween (see arrow 33). Remaining portions of frame 26 are thus spaced away from the glass window 12 (see arrow 33'). This limited contact reduces the cross-sectional area available for thermal leakage. Since it is assumed that absorber 14 would sag but for support 20 and because the latter may be designed to be off axis of the envelope 12, the receiver tube 14 and envelope 12 have closely spaced but non-colinear axes. (See dimension s in FIG. 1). As long as the dimension s is small, the axial discrepancy is not thought to be important in terms of efficiency. Similarly an axis for the support As may be located off center as shown. For purposes of the disclosure the support 20 can be said to be substantially concentric with the envelope 12 and/or absorber tube 14.

In another embodiment of the present invention illustrated in FIG. 3, the solar collector 10 incorporates a support 40. (Reflector 18 shown in FIG. 1 is omitted in order to simplify the drawing and other reference numerals are retained as appropriate.) The support 40 includes a frame member 46, a plurality of apertured retainer ears 42, rollers 44 and through shafts or bearings 48. Rollers 44 are carried by an associated one of the bearings 48 which have free ends 49 journaled or sleevably located in opposed axial apertures 43 of the retainer ears 42. The rollers 44 bear against the absorber 14 and maintain its spacing from the window 12 as well as allow for linear expansion and contraction of the absorber 14 along its axis At.

The support 40 is constructed so that only two of the three rollers 44 need actually contact the absorber 14 at any one time. Note for example the space between the uppermost roller 44 in the drawing of FIG. 3 and the absorber 14 (see arrow 35'). The lower two rollers 44 contact and bear absorber 14 against its weight in the downward direction at contact points 35. As above described in the embodiment of FIGS. 1 and 2, the frame 46 is designed to have minimal contact with the envelope 12 at lower portion 33 and be spaced away above at 33'. The fact that there are three rollers 44 mounted in the apertured retainer ears 42 as illustrated, simplifies the shipping process so that the solar receivers 10 can be oriented in any manner during shipping and installation or operation, however, for purposes of function the two lower rollers in the embodiment illustrated shown bear or carry the absorber tube 14 and accommodate its linear expansion.

Figure 5:
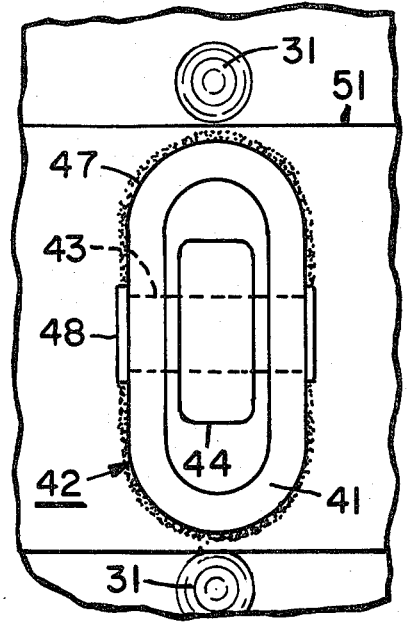

FIGS. 4 and 5 show the details of the retainer ears 42 and roller bearings 44 in enlarged views. Each of the former includes an oblong annular member 41 with the apertures 43 formed therein. Each roller 44 is mounted on bearing 48 as illustrated. The oblong members 41 may be welded to the frame 46 at weldment 47. It is possible also to provide a stamping for accomplishing the formation of the retainer ears 42 as an alternative. Dimples 31 in the wall of envelope 12 restrain axial movement of frame 46 at opposed margins 51 thereof.

Figure 6:
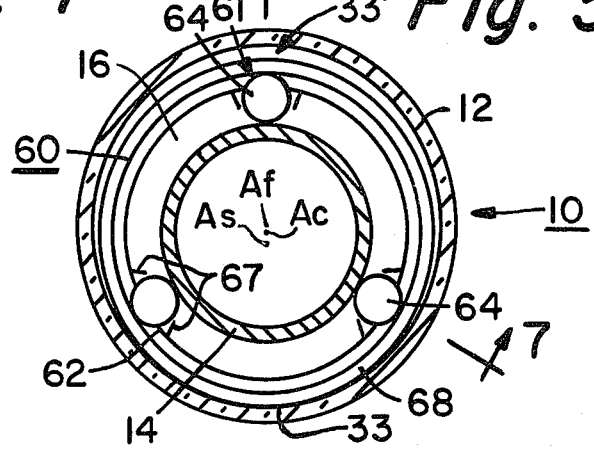
FIG. 6 is an end view in section of yet another embodiment of the present invention.
Figure 7:
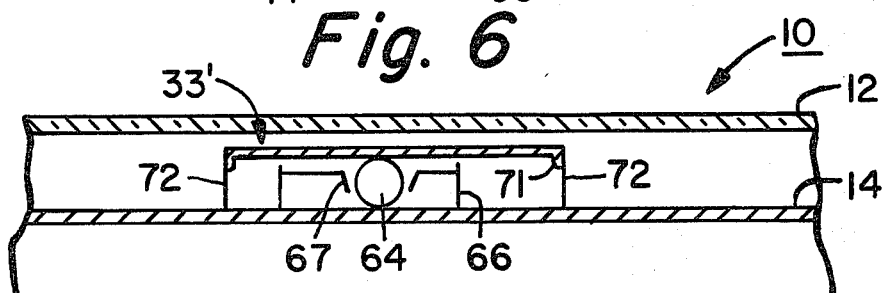
FIG. 7 is a side section in elevation taken along line 7—7 of FIG. 6.
Figure 7:
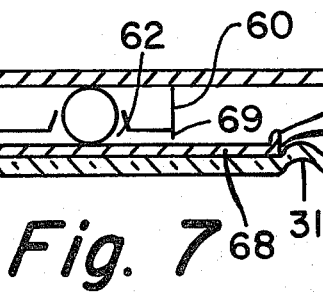

In the embodiments illustrated in FIGS. 6 and 7 the collector 10 has a support 60 in the form of a roller bearing and race set. Roller bearings 64 are accommodated in a race 66 which is similar to the frame members previously discussed. The roller bearings 64 carry the absorber 14 and space it from the glass of the solar window or envelope 12. In order to safeguard the glass from abrasion by roller bearings 64 a protective shield 68 is provided to both retain the roller bearings 64 in place and to protect the glass. Each of the roller bearings 64 are accommodated in apertures 62 of the race 66. Dimpled annular margins 67 of apertures 62 stabily locate the roller bearings 64 radially in the circumferential positions shown.

The race 66 includes depending ears 69 located at the opposed margins thereof and the shield 68 includes depending ears 71 directed in opposition to the ears 69. In FIG. 7 especially it can be seen that the respective ears 69 and 71 overlap radially. In addition the shield 68 is about twice as wide as the race 66 and as the absorber 14 expands and contracts the race 66 and roller bearings 64 move linearily or axially of the collector 10. In the embodiment shown the race 66 and roller bearings 64 will move linearily about one-half the amount that the absorber 14 moves during each thermal cycle. As the race 66 moves back and forth the ears 69 of the race 66 may engage the ears 71 of the shield 68 and thus prevent the race 66 from creeping therebeyond. The dimples 31 are located in the wall of the glass envelope 12 at opposed margins 72 of the shield 68 near the ears 71 to retain the entire assembly of the support 60 axially in place.

As in the earlier embodiments described herein the uppermost of the roller bearings 64 carries essentially none of the weight of the absorber tube 14. In this embodiment as above the support 60 has a diameter somewhat smaller than that of the window 12 and thus when the collector 10 is in the horizontal position shown, the shield 68 rests on the lower inside surface of the window 12 at 33 and leaves spaces near the upper portion 33' as illustrated. This loose fitting arrangement not only reduces thermal cross section as mentioned above but allows for wall thickness and diameter variation of the components.

The material forming the supports illustrated in the various embodiments herein may be fabricated from highly reflective material in both the visible and infrared range thus avoiding excessive localized heating of the glass envelope as the support comes in contact therewith. Further some of the bearings might be fabricated from ceramic material in order to reduce the thermal conductivity of the path between the absorber 14 and the window 12.

Referring to FIGS. 1 and 2, it should be understood that slots 21 in frame 26 which are engaged by dimples 28 to prevent circumferential creep may be provided as desired in the embodiments of the remaining Figures.

It should be realized that while the embodiments described above are preferred the invention can be adapted for other types of collectors, specifically flat plates and evacuated tubular collectors utilizing such structures, if the absorber in such a device needs support. In such a case, the frame would be modified to accommodate the shape and configuration of the absorber.

We claim:

1. In a solar energy collector having a solar window portion and a thermally cyclical solar energy receiver element located therewithin, a support for the receiver element adapted to locate same in spaced relation with respect to the window and to accommodate linear expansion and contraction of the receiver element relative to the window due to thermal cycles thereof, the support comprising; a bearing adapted to engage opposed surfaces of the receiver element and the window including a plurality of roller bearings being selectively located between the opposed surfaces of said window and said receiver for spacing one from the other and being free to rollably carry the receiver element as it expands and contracts during thermal cycles, and a frame member located between said opposed surfaces of said window and said receiver including retainer means for associatively accommodating one each of the roller bearings therein and securing each to a limited path of rotation relative to the window and the receiver element during each thermal cycle.

2. The support of claim 1 further including means associated with at least one of said opposed surfaces for engaging with and relatively fixedly locating the frame relative thereto in a direction of expansion and contraction of the receiver.

3. The support of claim 1 wherein the frame includes a pair of concentric members having lateral margins, each member engaging one of the respective surfaces of the housing and the receiver element, and the retainer means includes a pair of ears, one each depending from each margin extending towards the other by an amount such that a distal portion of one ear overlaps a similar portion of an opposed member both radially and transversely, and said roller bearing being located between the overlapping ears.

4. The support of claim 1 wherein the frame includes a first member substantially concentric with one of the window and the receiver element having lateral margins, the frame engaging one of said opposed surfaces and the retainer means includes, depending ears extending from margins thereof towards the opposite surface a sufficient distance to secure the roller laterally therein over a portion of its diameter.

5. The support of claim 4 wherein the frame includes a second substantially concentric member opposed to the first mentioned one engaging the opposite surface from the first for bearing diametrically against the roller bearing.

6. The support of claim 1 wherein the frame includes a member substantially concentric with one of the surfaces and the retainer means is formed of apertures in the concentric member for receiving therein at least an associated one of the roller bearings.

7. An evacuated solar tubular collector wherein a tubular receiver element is axially surrounded and sealed within a tubular glass envelope or solar window, a support for the receiver element comprising: a bearing adapted to accommodate linear expansion and contraction of the receiver element relative to the window due to thermal cycles thereof, said bearing adapted to engage opposed substantially concentric surfaces of the receiver element and window including an annular frame member adapted to be fitted about the receiver element and loosely within the window, said frame having retainer apertures circumferentially located therein and a roller bearing located within each of the apertures adapted to closely engage the receiver element to space it from the window and rollably accommodate axial movement thereof, means associated with the window adapted to engage the frame and axially locate same within the envelope to inhibit axial creep of the bearing during thermal cycling of the receiver.

8. The support of claim 7 wherein the frame includes circumferentially located retainer ears radially depending from the frame having the retainer apertures located therein as a pair of opposed openings axially parallel with the receiver; and each of the roller bearings includes a roller wheel and shaft axially mounted thereto, having opposed free ends sleeved within the opposed openings of the ears.

9. The support of claim 7 wherein the frame is fabricated from a material having a relatively high infrared and visible reflectance.

10. The support of claim 7 wherein the roller bearings are fabricated from thermally insulated material.

11. The support of claim 7 wherein the frame is adapted to rest against the window and space it from the receiver element and provide a minimum area of contact with the former for reducing thermal leakage from the receiver to the window.

12. The support of claim 7 wherein the frame includes: a pair of substantially concentric annular rings, an inner one having apertures to accommodate the roller bearings therein and outer one adapted to surround the rollers radially and shield the window from contact therewith.

13. The support of claim 7 wherein the means for locating the frame axially of the window include dimples formed interiorally of the window and being spaced to engage opposed axial margins of the frame and retain it therebetween.

14. The support of claim 13 wherein the frame has marginal slots for engaging the dimples for preventing circumferential creep thereof.

* * * * *